United States Patent
Arbel et al.

(10) Patent No.: US 7,139,291 B2
(45) Date of Patent: Nov. 21, 2006

(54) HITLESS RECONFIGURATION OF A SWITCHING NETWORK

(75) Inventors: Ygal Arbel, Belmont, CA (US); Robert Louis Caulk, Livermore, CA (US); Christoph Dominique Loeffler-Lejeune, Sunnyvale, CA (US)

(73) Assignee: Bay Microsystems, Inc., San Jose, CA (US)

( * ) Notice: Subject to any disclaimer, the term of this patent is extended or adjusted under 35 U.S.C. 154(b) by 978 days.

(21) Appl. No.: 10/116,664

(22) Filed: Apr. 4, 2002

(65) Prior Publication Data

US 2003/0202545 A1 Oct. 30, 2003

(51) Int. Cl.
*H04J 3/02* (2006.01)
*H04L 12/28* (2006.01)
*H04L 12/56* (2006.01)
*H04L 12/66* (2006.01)

(52) U.S. Cl. .............. 370/537; 370/422; 370/539
(58) Field of Classification Search ........... 370/537, 370/539, 389, 422, 427, 216–228, 220
See application file for complete search history.

(56) References Cited

U.S. PATENT DOCUMENTS

| | | | | |
|---|---|---|---|---|
| 4,873,694 A | * | 10/1989 | Schmidt et al. ......... 370/220 |
| 5,329,524 A | * | 7/1994 | Paker et al. ........... 370/370 |
| 5,706,975 A | * | 1/1998 | Cronk ................ 220/737 |
| 6,034,947 A | * | 3/2000 | Yoshida et al. ......... 370/244 |
| 6,035,080 A | * | 3/2000 | Henry et al. ........... 385/24 |
| 6,262,973 B1 | * | 7/2001 | Shiraishi et al. ....... 370/228 |
| 6,807,186 B1 | * | 10/2004 | Dally et al. ........... 370/413 |
| 6,822,975 B1 | * | 11/2004 | Antosik et al. ......... 370/538 |
| 2001/0053160 A1 | * | 12/2001 | Dally ................. 370/535 |
| 2002/0001305 A1 | * | 1/2002 | Hughes et al. ......... 370/369 |
| 2002/0093952 A1 | * | 7/2002 | Gonda ................ 370/369 |
| 2002/0172150 A1 | * | 11/2002 | Kano ................. 370/216 |
| 2003/0043735 A1 | * | 3/2003 | Iijima ................ 370/218 |
| 2003/0058848 A1 | * | 3/2003 | Dally ................ 370/360 |

* cited by examiner

*Primary Examiner*—Chirag Shah

(57) ABSTRACT

A multi-stage switching network that can hitlessly reconfigure itself comprising a controller that controls each stage separately. The controller designates the paths through each stage according to the set of paths currently active. If the set of paths changes, the controller sends a new set of paths to the first stage while using the old set of paths for the second stage during a first frame. On the next frame, the controller causes both stages to use the new set of paths.

12 Claims, 16 Drawing Sheets

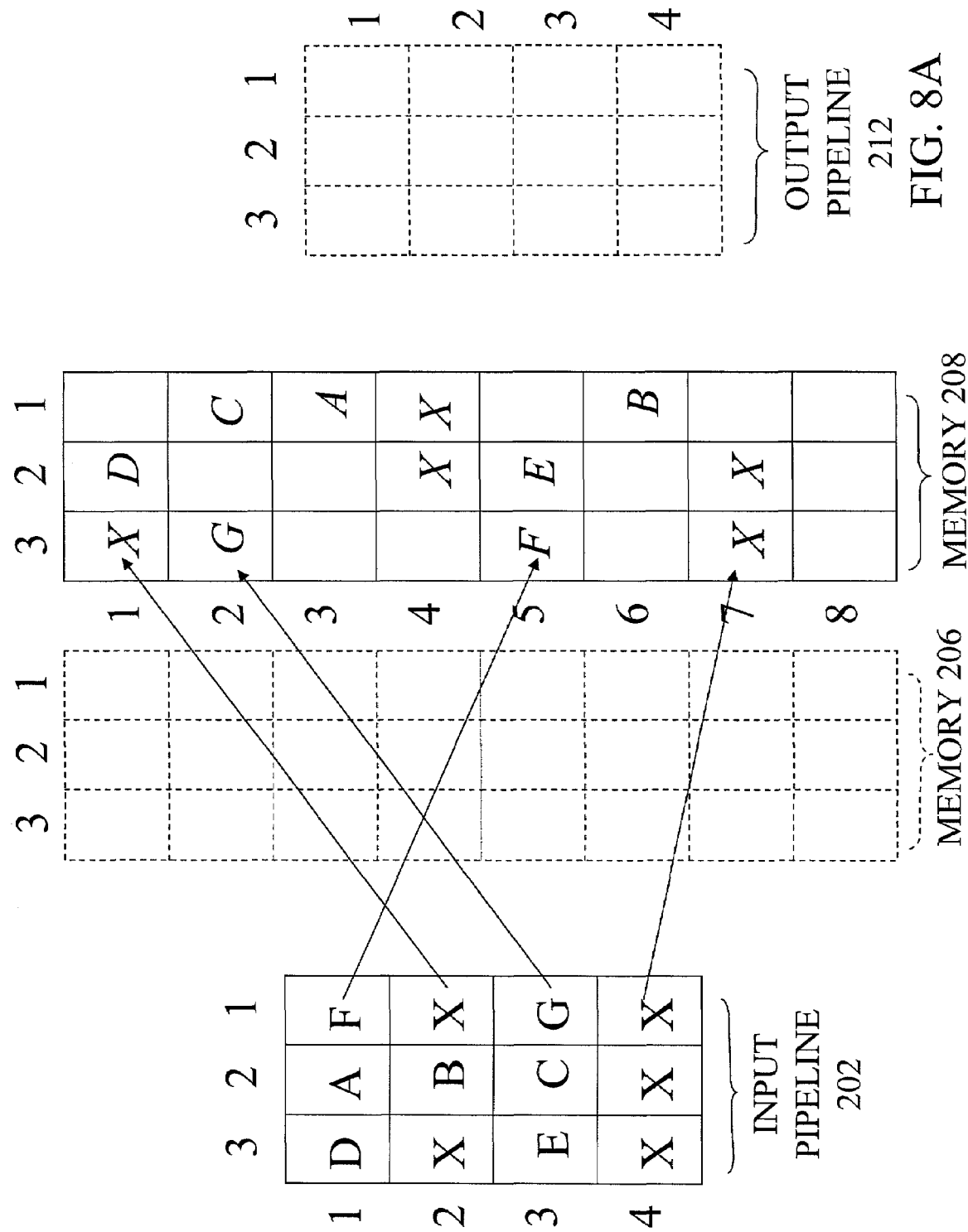

HITLESS RECONFIGURATION OF A SWITCHING NETWORK

CROSS-REFERENCE TO RELATED APPLICATION

This patent application is related to U.S. patent application Ser. No. 09/974,448, filed Oct. 10, 2001, and assigned to the assignee of this invention.

FIELD OF THE INVENTION

This invention relates to the field of switching networks, and, more specifically, to a multi-stage switching network capable of switching communications signals according to a new set of paths through the switching network before all stages have finished switching previous communications signals according to a previous set of paths.

BACKGROUND OF THE INVENTION

Fiber optics transmission is the medium of choice for voice and data service provider networks. Currently, fiber optics provides the highest bandwidth per unit cost of any transmission medium. Early fiber optic systems, however, were expensive because they used proprietary architectures, equipment line codes, multiplexing formats, etc., such that one fiber optic system could not be connected to another unless they were both from the same manufacturer.

In response, Bellcore established a standard for connecting one optical fiber component or system to another. That standard is officially named the "Synchronous Optical Network" but is more commonly called "SONET." The international version of the standard is officially named the "Synchronous Digital Hierarchy" but it is more commonly called "SDH." Although differences exist between SONET and SDH, those differences are mostly in terminology. In most respects, the two standards are the same and, therefore, virtually all equipment that complies with either the SONET standard or the SDH standard also complies with the other. Therefore, for the purposes of this specification, the SONET standard and the SDH standard shall be considered interchangeable and the acronym/initialism "SONET/SDH" shall be defined as either the Synchronous Optical Network standard or the Synchronous Digital Hierarchy standard, or both.

The basic SONET/SDH communications signal is defined as a Synchronous Transport Signal level 1 (STS-1). An STS-1 is comprised of so-called "SONET frames", each being an 810-byte data packet comprising transport overhead (the information required to maintain communication) and payload (the data itself). For the purposes of this specification, a "STS-N" is defined to comprise N STS-1's. For example, an STS-768 comprises the data and overhead from 768 STS-1's. Furthermore, for the purposes of this specification, an "STS-N frame" is defined to comprise one byte per STS-1 SONET stream, i.e., a total of N bytes.

SONET/SDH provides specifications for digital transmission bandwidths that were previously not possible. By using equipment that can provide add/drop and through switching of SONET/SDH-based communications, commonly called "nodes", service providers can use their currently embedded fiber optic transmission facilities to effect higher bandwidth over the same fiber. Further, SONET/SDH provides for a high level of communications signal integrity. SONET/SDH nodes can detect problems in transmission facilities and take corrective action, such as automatic protection switching.

To provide automatic protection switching, SONET/SDH specifies that two facilities be reserved through a SONET/SDH network: a working facility and a protection facility. When a problem is detected on the working facility (i.e., a discontinuity of signal or a high bit error rate), the nodes in the network switch from the working facility to the protection facility. This switch to the protection facility requires reconfiguration of a node's switching network and may include rearranging how signals are added to and/or dropped from the main transmission facility signal.

A problem in the art is that current switching networks nodes generally have multiple stages to provide non-blocking paths for maximum throughput. Generally, a switching network requires a "frame" of time to switch one STS-N frame through each stage. If a switching network is reconfigured immediately upon receipt of the automatic protection switching request, STS-N frames traversing the switching network are lost. Alternatively, STS-N frames already in the switching network complete all of the stages, while further STS-N frames are held up or dropped until the switching network is clear and the paths through the switching network are reconfigured for automatic protection switching. This time lag means that the communications takes a "hit", because a portion of the communication signal is lost during the reconfiguration period.

SUMMARY OF THE INVENTION

This problem is solved and a technical advance is achieved in the art by a system and method that provides a multi-stage switching network capable of switching SONET/SDH-based communications signals according to a new set of paths through the switching network before all stages have finished switching previous communications signals according to a previous set of paths. Such reconfiguration is called "hitless" herein because not a single bit of data is lost during the change over from a first set of paths to a second set of paths.

A switching network according to an embodiment of this invention includes a two-stage switching network that can switch up to the maximum bandwidth of SONET/SDH in two frames. The first stage and the second stage operate independently on subsequent frames of communications. Thus, the first state can switch according to a second set of paths, while the second stage completes switch communication data with a first set of paths. During a first frame, the first stage switches communications signals from an input according to a first set of paths into a buffer. During a second frame, data from the buffer is switched according to the first set of paths to an output, while the first stage switches communications signals according to a second set of paths. During a third frame, both stages are switching data according to the second set of paths. Advantageously, the exemplary embodiment of this invention includes two buffers so that one buffer may be filled from the input, while the other is emptied to the output during one frame, and vice-versa. Further, the first stage is a space switch and the second stage is a time-space switch, according to an exemplary embodiment. Advantageously, a controller configures the paths through each stage independently.

According to one exemplary method of this invention, a first stage and a second stage of a switching network switch according to a first set of paths during a first frame. The first stage then switches according to a second set of paths during a second frame. Simultaneously, the second stage switches according to the first set of paths. During a third frame, the first stage and the second stage switch according to the second set of paths.

According to a further exemplary method of this invention, a switching network comprising N stages switches in all N stages according to a first set of paths during a first frame. Next, the switching network switches in M of said N stages according to a second set of paths and switching in M+1 through N stages according to the first set of paths, where M=1 initially. The controller of the switching network increments M and repeats the previous step until M=N. The switching network then switches in all N stages according to the second set of paths.

In this manner, a switching network that can be reconfigured "hitlessly" may be implemented.

BRIEF DESCRIPTION OF THE DRAWINGS

A more complete understanding of this invention may be obtained from a consideration of the specification taken in conjunction with the drawings, in which:

FIGS. 6A–8B are block diagrams of the operations of the switching network of FIG. 2 during a second frame;

DETAILED DESCRIPTION

A switching network according to an exemplary embodiment of this invention may be constructed on a switching network platform in accordance with the one described in U.S. patent application Ser. No. 09/974,448, filed Oct. 10, 2001, and assigned to the assignee of this invention, which is incorporated herein in its entirety. The switching network described therein is a two-stage switch. The first stage comprises a space switch, and the second stage is a time and space switch. The first stage switches from an input into a first buffer, while the second stage switches from a second buffer (loaded in a previous frame by the first stage). The first stage then switches from the input to the second buffer, while the second stage switch from the first buffer to the output. Thus, data at the input is switched completely through the switching network in two frames.

A controller controls each stage separately. The controller designates the paths through each stage according to the set of paths that are currently active. If the set of paths changes, the controller sends a new set of paths to the first stage, while using the old set of paths for the second stage during a first frame. On the next frame, the controller causes both stages to use the new set of paths. In this manner, the switching network does not have to "drain", that is, wait until all data has passed completely through the switching network. Thus, this invention is "hitless."

Figure 1:
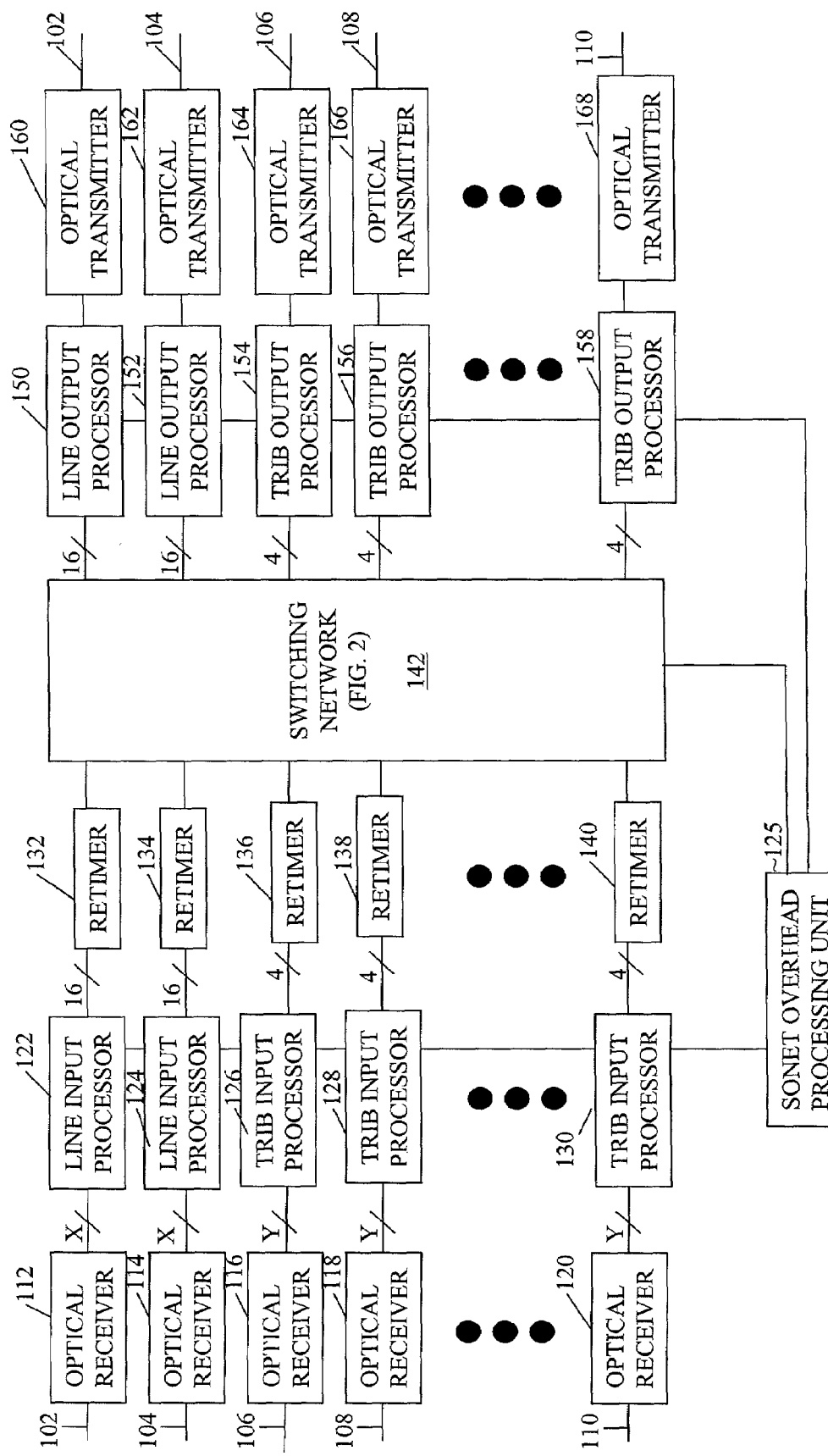
FIG. 1 illustrates a block diagram of an application of a switching network according to an exemplary embodiment of this invention in the context of a SONET/SDH add/drop multiplexer.

FIG. 1 is a block diagram of add/drop multiplexer 100 for use in a SONET/SDH node illustrating a switching network in accordance with an exemplary embodiment of this invention. Add/drop multiplexer 100 receives two optical signals through lines 102 and 104, and 8 optical tributaries ("tribs"), represented by lines 106, 108 and 110. Through lines 102 and 104 generally connect nodes in a SONET/SDH ring, as is known in the art. Tribs 106, 108 and 110 are generally smaller bandwidth pipes that originate, terminate, or otherwise transfer a data stream on the SONET/SDH ring. In the block diagram of FIG. 1, lines 102, 104 and tribs 106, 108, 110 are connected to a plurality of optical receivers 112, 114, 116, 118 and 120. Optical receivers 112 and 114 receive optical signals from lines 102 and 104, respectively, and convert the data into the electrical domain, as is known in the art and defined in SONET/SDH. Optical receivers 116, 118 and 110 receive optical signals from tribs 106, 108 and 120, respectively, and convert the data into the electrical domain, as is known in the art and defined in SONET/SDH. In this exemplary embodiment, optical receivers 112, 114, 116, 118 and 120 deserialize signals into "lanes" of parallel data. The output of line optical receives 112 and 114 are x lanes wide, and the outputs of trib output receivers 116, 118 and 120 comprises y lanes of data. In the exemplary embodiment of this invention, x=16 and y=4. Other configurations of input and output lanes will be apparent to one skilled in the art after studying this disclosure.

Line optical receivers 112 and 114 are each connected to a SONET/SDH line input processor 122 and 124, respectively, which removes the SONET overhead information and forwards it to a SONET overhead processing unit 125. SONET/SDH overhead processing unit 125 is also known in the art from SONET/SDH, and thus not further discussed here. Line optical receivers 116, 118 and 120 are connected to SONET/SDH trib input processors 126, 128 and 130, respectively. SONET/SDH trib processors 126, 128 and 130 also send overhead information from their respective tribs to SONET/SDH overhead processing unit 125. All line and trib input processors 122, 124, 126, 128 and 130 operate according to the SONET standard, do not comprise part of the invention claimed herein and thus will not be discussed further.

The outputs of line input processors 122 and 124 comprise 16 parallel data lanes in this exemplary embodiment, comprising one byte of data each. Further, the outputs of SONET trib input processors 126, 128 and 130 comprise 4 parallel lanes, in this exemplary embodiment, comprising one byte of data each. As a result, the output of all of the input processors 122, 124, 126, 128 and 130 (and those not shown) is 64 parallel data lanes.

All concurrent output lanes from line and trib input processors 122, 124, 126, 128 and 130 are fed into respective retimer 132, 134, 136, 138 and 140. Retimers 132, 134, 136, 138 and 140 align all of the 64 lanes in time for processing in parallel by switching network 142, as will be described below. The functionality of retimers 132, 134, 136, 138 and 140 is also known in the art and described in the SONET standard and thus not further described herein. Switching network 142, switches all lanes in a space-time-space manner, wherein any lane may be switched to any other lane, thus providing a complete cross-connect in one switching network 142, as will be described further, below.

The output of switching network 142 comprises 64 parallel lanes, which are delivered to output processors. 16 lanes are delivered to each of a SONET line output processor 150, 152. 4 lanes are delivered to each of a SONET trib output processor, represented by output processors 154, 156 and 158. SONET line and trib output processors 150, 152, 154, 156 and 158 receive overhead data from SONET overhead processing unit 125. Line output processors 150 and 152 deliver their output to electrical-to-optical converters 160 and 162, which serialize the data and transmits it on optical lines 102 and 104, respectively. Trib output processors 154, 156 and 158 deliver their output to electrical-to-optical converters 162, 164 and 166, respectively, which serialize the data and transmits it on optical lines 106, 108 and 110, respectively.

Figure 2:
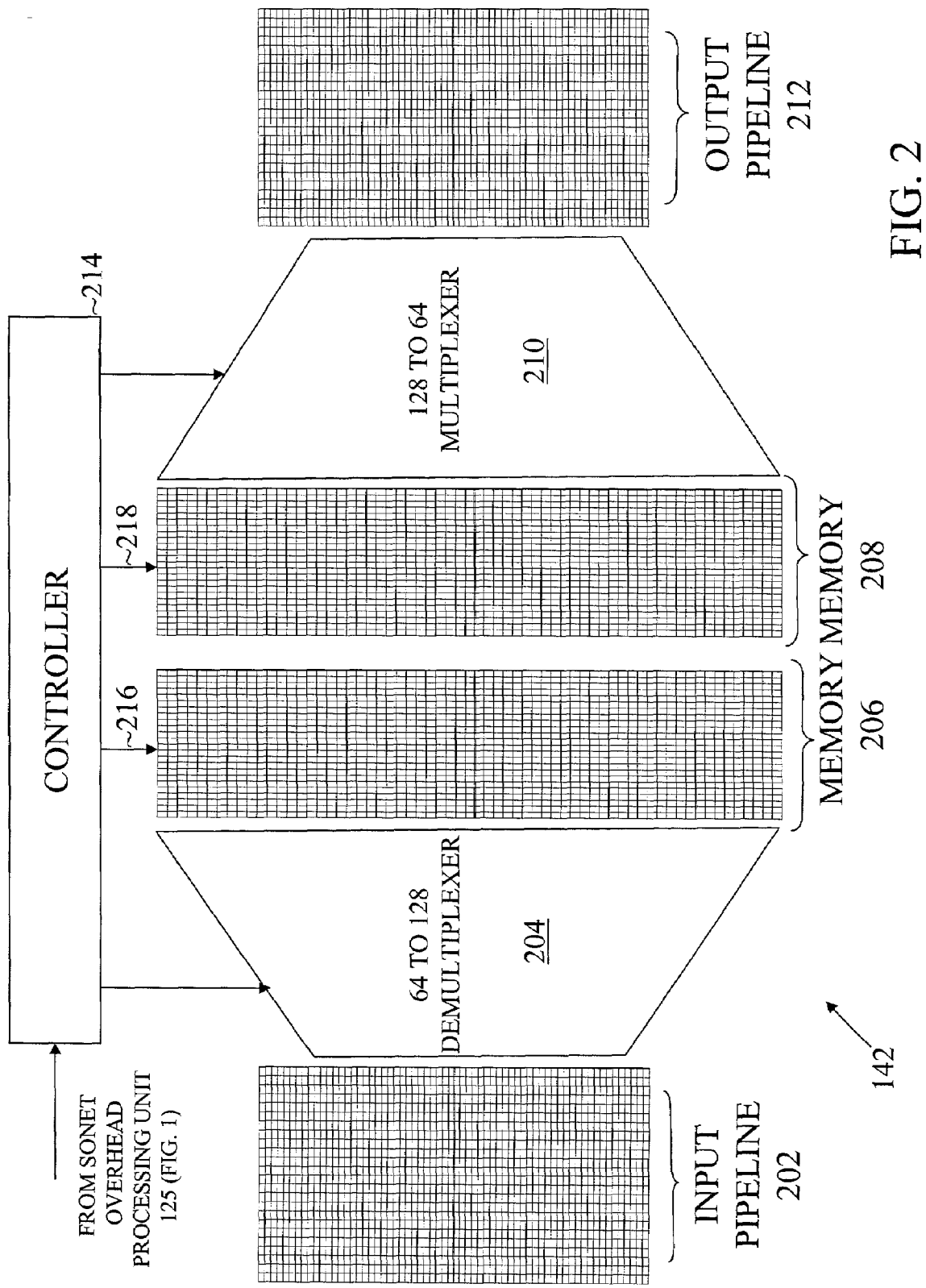
FIG. 2 is a block diagram of the switching network of FIG. 1 according to an exemplary embodiment of this invention.

FIG. 2 is a block diagram of switching network 142 according to an exemplary embodiment of this invention. Switching network 142 comprises input pipeline 202, demultiplexor 204, first memory 206, second memory 208, multiplexer 210, and output pipeline 212. Controller 214 controls the connections within demultiplexor 204 and multiplexer 210, and read pointers 216 and 218 into memories 206 and 208, respectively. Input 202 is illustrated as a pipeline array, comprising x rows by y columns. In the exemplary embodiment, x is 64 and y is 48. Each row is one lane, as defined above. Each column is one time slot. Each lane in this exemplary embodiment comprises a byte (8 bits). Therefore, there are 64 bytes being switched in parallel in this example. One skilled in the art will be able to scale this example to more or less parallel switching after studying this disclosure. Pipelines are used in this illustration as inputs 202 and outputs 212, but other types of inputs and outputs may be devised by those skilled in the art after studying this disclosure.

The y dimension of input array 202 comprises a plurality of time slots. In this exemplary embodiment, therefore, there are 48 clock cycles for each frame through the switching network 142. Again, one skilled in the art will be able to scale this example to a specific application after studying this disclosure.

Demultiplexer 204 is connected to input pipeline 204 to receive one column in parallel, and switch the data in parallel according to a set of paths through demultiplexer 204 into one of memories 206 or 208 during one clock cycle, as will be explained further, below. Memories 206 and 208 each comprises a 128 by 48 array of memory blocks of sufficient size to hold the data. Of course, registers or other forms of data storage may be used. Therefore, demultiplexer 204 comprises a 64 to 128 demultiplexer network.

In operation, controller 214 configures demultiplexer 204 for the optimal routing of one column of input 204 into one of first memory 206 or second memory 208 (a first path of the set of paths). Thus, during the first clock cycle, the first column of data are routed through demultiplexer 204 and stored in the first column of one of memories 206 or 208. The data in input pipeline 202 moves forward one column. During the second clock cycle, controller 214 reconfigures demultiplexer 204 according to a second path of the set of paths and the second column of input 204 is routed into the second column of memory 206 or 208. During each succeeding clock cycle, controller 214 causes demultiplexer 204 to reconfigure and move each y column into the corresponding y column of memory 206 or 208, while sorting in the x dimension. When all 48 columns have been sorted, all columns in memory 206 or 208 contain data and a frame is complete. As is clear from the above description, demultiplexer 204 may change the relative x position of data within a y column, as is known in the art, and therefore comprises a space switch.

Continuing with FIG. 2, memories 206 and 208 are connected to output pipeline 212 by multiplexer 210. Multiplexer 210 comprises, in this exemplary embodiment, a 128 to 64 multiplexer. Output pipeline 212 is illustrated as 48 by 64 array, in the same manner as input pipeline 204.

In operation, controller 214 configures multiplexer 210 to empty memory 206 or 208 that previously has been filled by demultiplexer 204. Controller 214 causes data in any row or column of memory 206 or 208 to be routed to a row in a specified column in output pipeline 212 according to the set of paths. Thus, a read pointer 216 or 218 from controller 214 may point to any row or column during a clock cycle, and also sets the path through multiplexer 210 to cause that data to flow to a selected row and column (selected by the time slot within the frame) in output 212. The second stage of switching network is a combined time and space switch, in that time slots may be interchanged by selecting a read column and multiplexer 210 may switch the row number.

A constraint imposed by the exemplary embodiment is that, given the current construction of memories, only one read may occur per row per clock cycle. Therefore, controller 214 must ensure that no two data items that are destined for the same column in output 212 are in the same row in memory 206 or 208. One skilled in the art may readily comprehend that other intermediate storage buffers may not be so limited after a study of this specification.

Two memories 206 and 208 are used in this exemplary embodiment to facilitate speed through the two stages. As one memory, for example, memory 206, is being filled by demultiplexer 204, memory 208 may be emptied by multiplexer 210. In this manner, only two frames are required to switch data through the equivalent of a space-time-space switch, which in most instances in the prior art takes at least three frames. Memories 206 and 208 may be one large memory, as in the exemplary embodiment of this invention, or may be separate memory or registers.

Further, memories 206 and 208 may be 2y by x and achieve the same or similar results. The time and space-time stages may also be reversed, by placing the buffer in the input. Such variations will be apparent to those skilled in the art after studying this disclosure, and are intended to be covered by the attached claims.

Also, pipeline stages 202 and 212 do not need to have a physical implementation with y columns. It is sufficient to have one column of input data arriving at the input of demultiplexor 204 every clock cycle. At the output of multiplexer 210, each data column can immediately be transmitted to the next block after exiting multiplexor 210. Such variations will be apparent to those skilled in the art after studying this disclosure, and are intended to be covered by the attached claims.

SONET/SDH specifies the organization of data within each SONET/SDH frame. It is known in the art that the SONET/SDH frame accommodates payloads of varying sizes. Network services from STS-1 (51.84 Mb/s) to the entire bandwidth of the line, STS-768, can be accommodated. The position of each STS-N in each frame is specified in SONET/SDH. Therefore, since the incoming lines and tribs are known, controller 214 calculates the STS-N's that are to be moved from one stream to another. Furthermore, since the time slots are timed in retimers 132, 134, 136, 138 and 140 to coincide such that, when all 64 lanes are fed into input 202, controller 214 can move STS-N's around from lines to tribs, tribs to lines, tribs to tribs, through lines or tribs, etc. Thus, in two frames, switching network 142 of this invention can add, drop or through put any defined SONET data stream according to the calculated set of paths.

A description of the operation of switching network 142 is described in the aforementioned Ser. No. 09/974,448 patent application, previously incorporated by reference.

That specification illustrates an example the flow of communications signals through switching network 142 from input pipeline 202 to output pipeline 212 according to only one set of paths (no reconfiguration), which is normal operation. This specification will now illustrate an example of the flow of communications signals through switching network 142 from input pipeline 202 to output pipeline 212 during a hitless reconfiguration from a first set of paths through switching network 142 to a second set of paths.

Turning now to FIGS. 3–11, three frames of communications signals are illustrated undergoing hitless reconfiguration, according to an exemplary embodiment of this invention are shown, in simplified form. These FIGS illustrate a hitless change from a first set of paths through switching network 142 to a second set of paths. FIGS. 3–11 illustrate an x=4 by y=3 pipeline input 202 and an x=4 by y=3 pipeline output 212. Further, memories 206 and 208 are illustrated as x=8 by y=3, each. These dimensions were selected for brevity and clarity of this description. Each lane of communications signals is represented by one of the string of letters A–G. "X's" represent null data.

Figure 3:
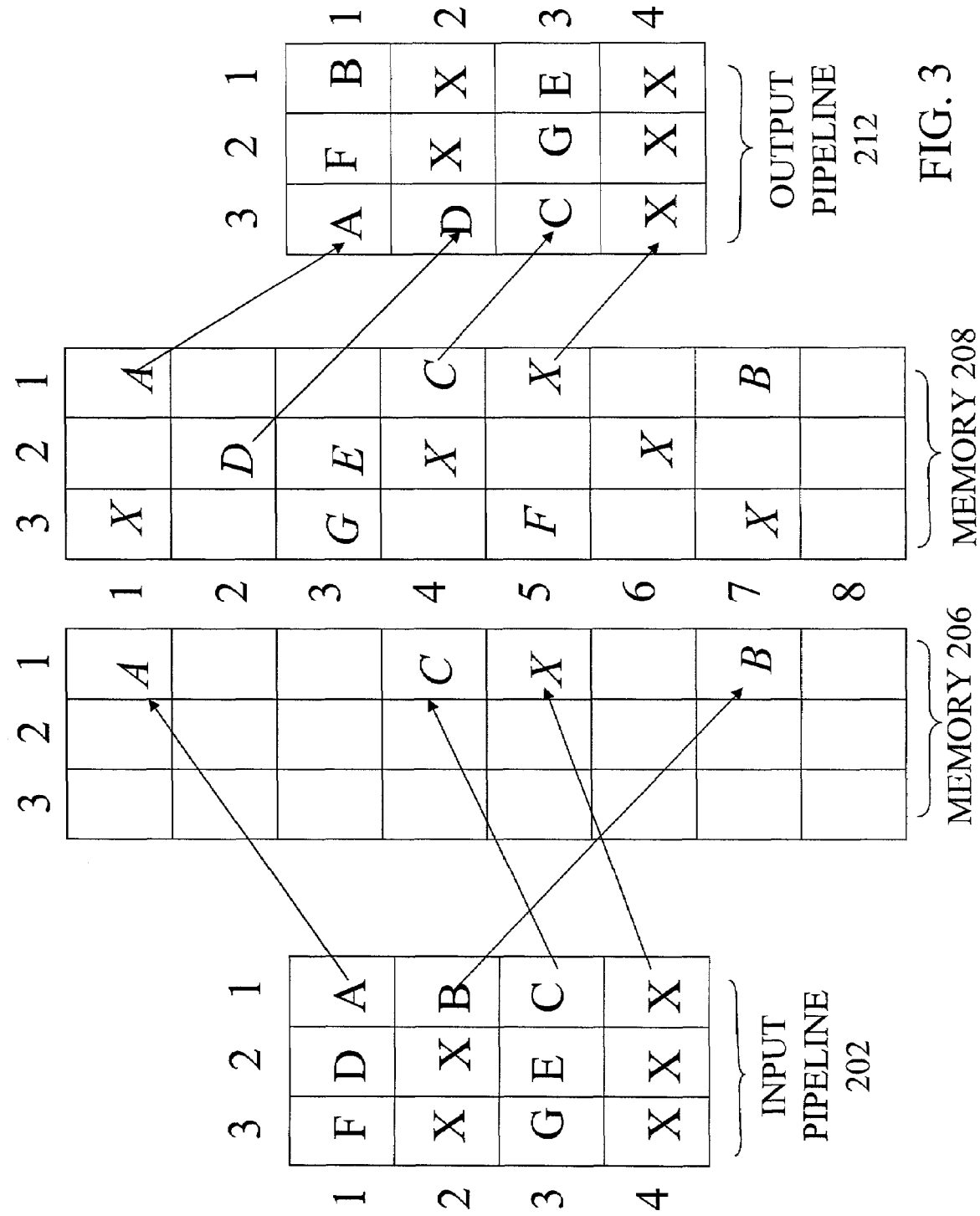
FIGS. 3–5 are block diagrams of the operations of the switching network of FIG. 2 during a first frame.
Figure 4:
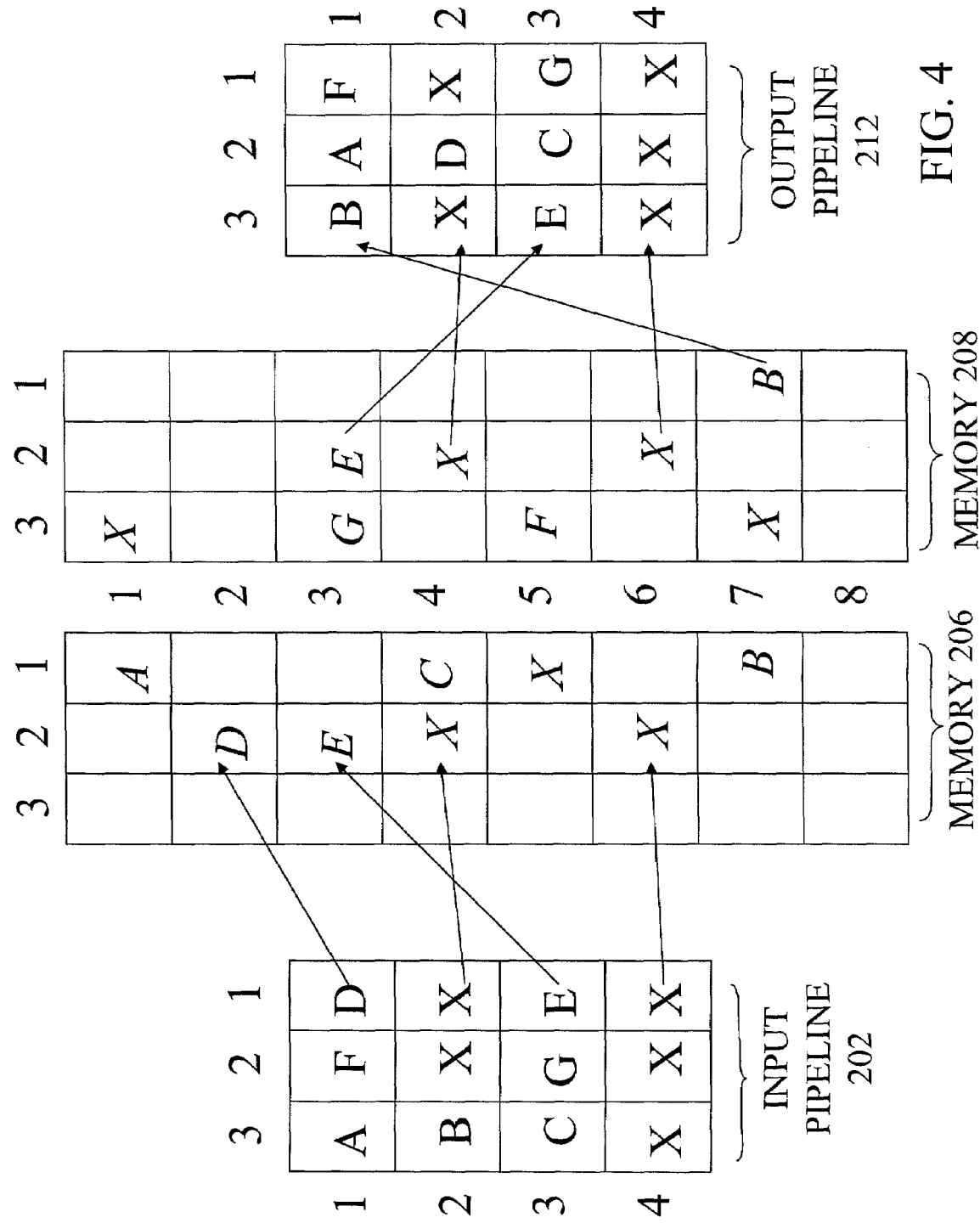
Figure 5:
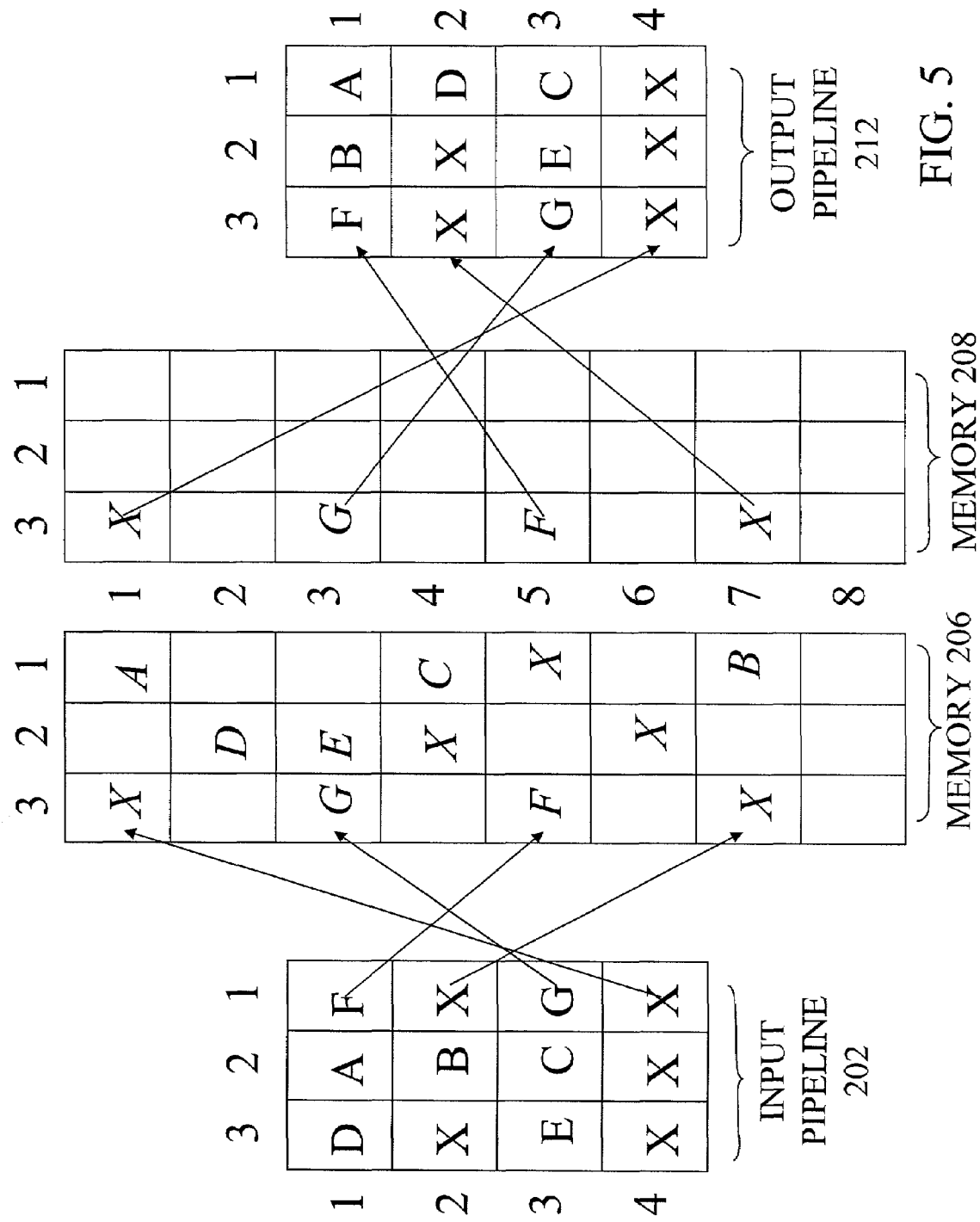
Figure 7A:
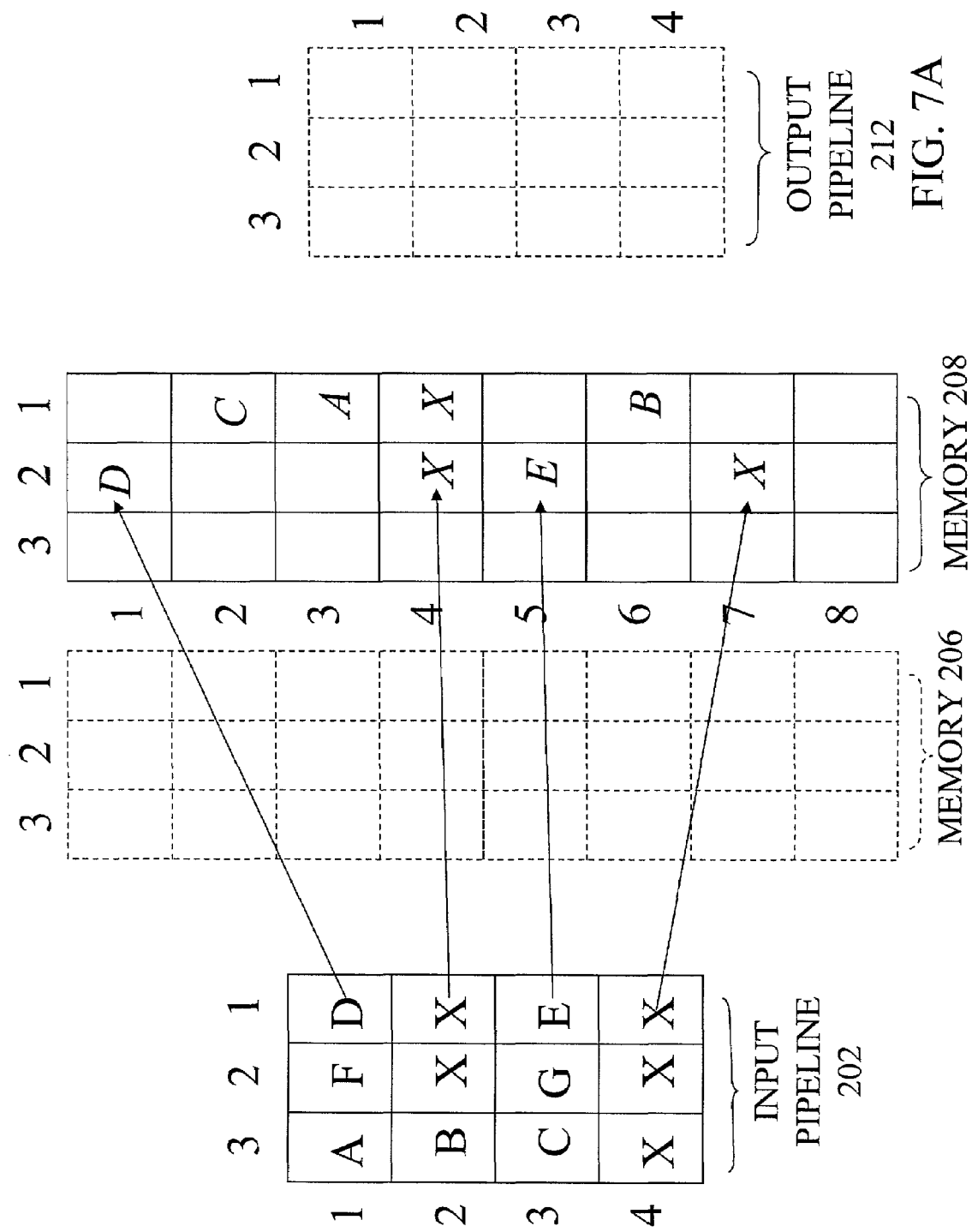
Figure 7B:
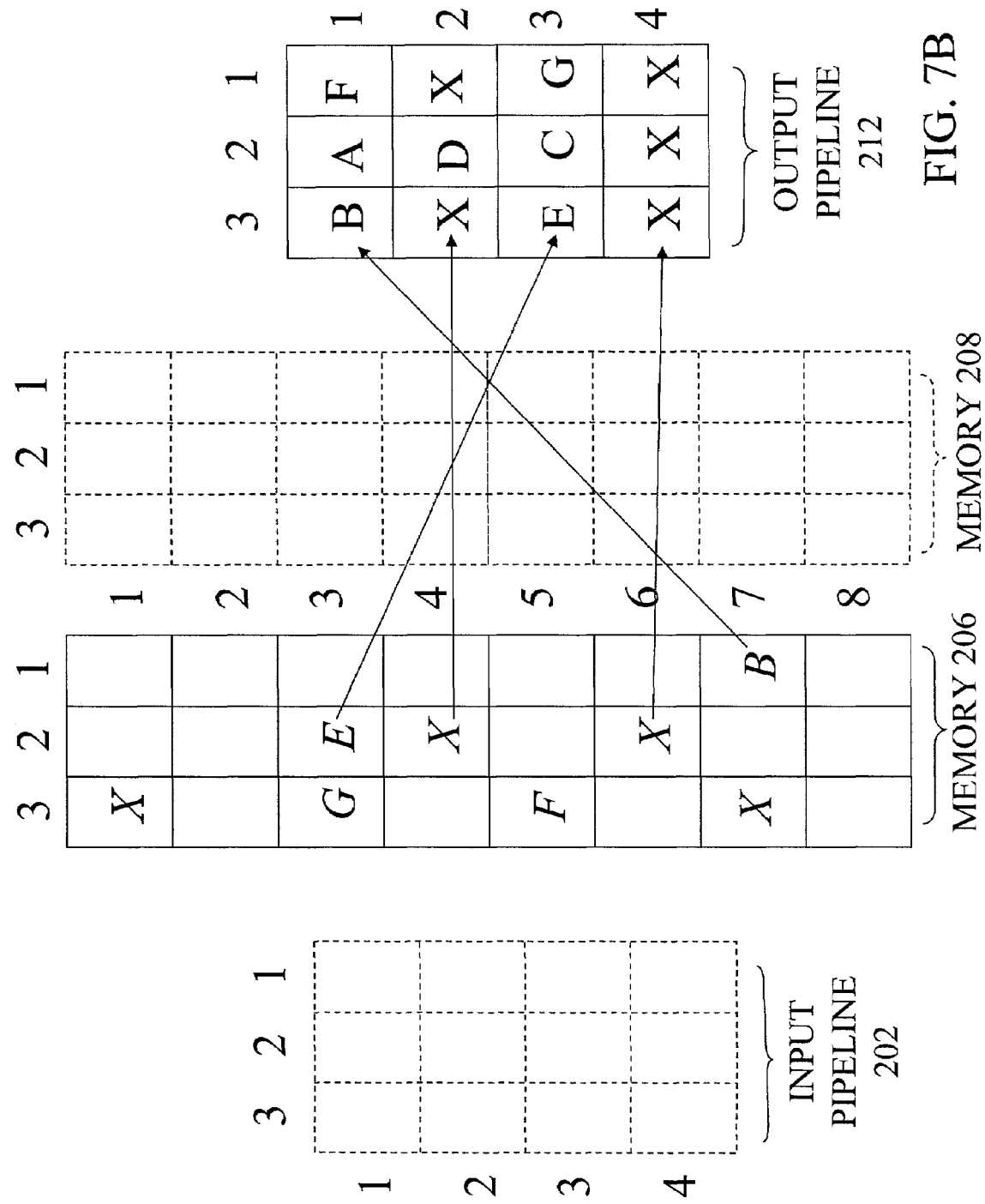
Figure 8B:
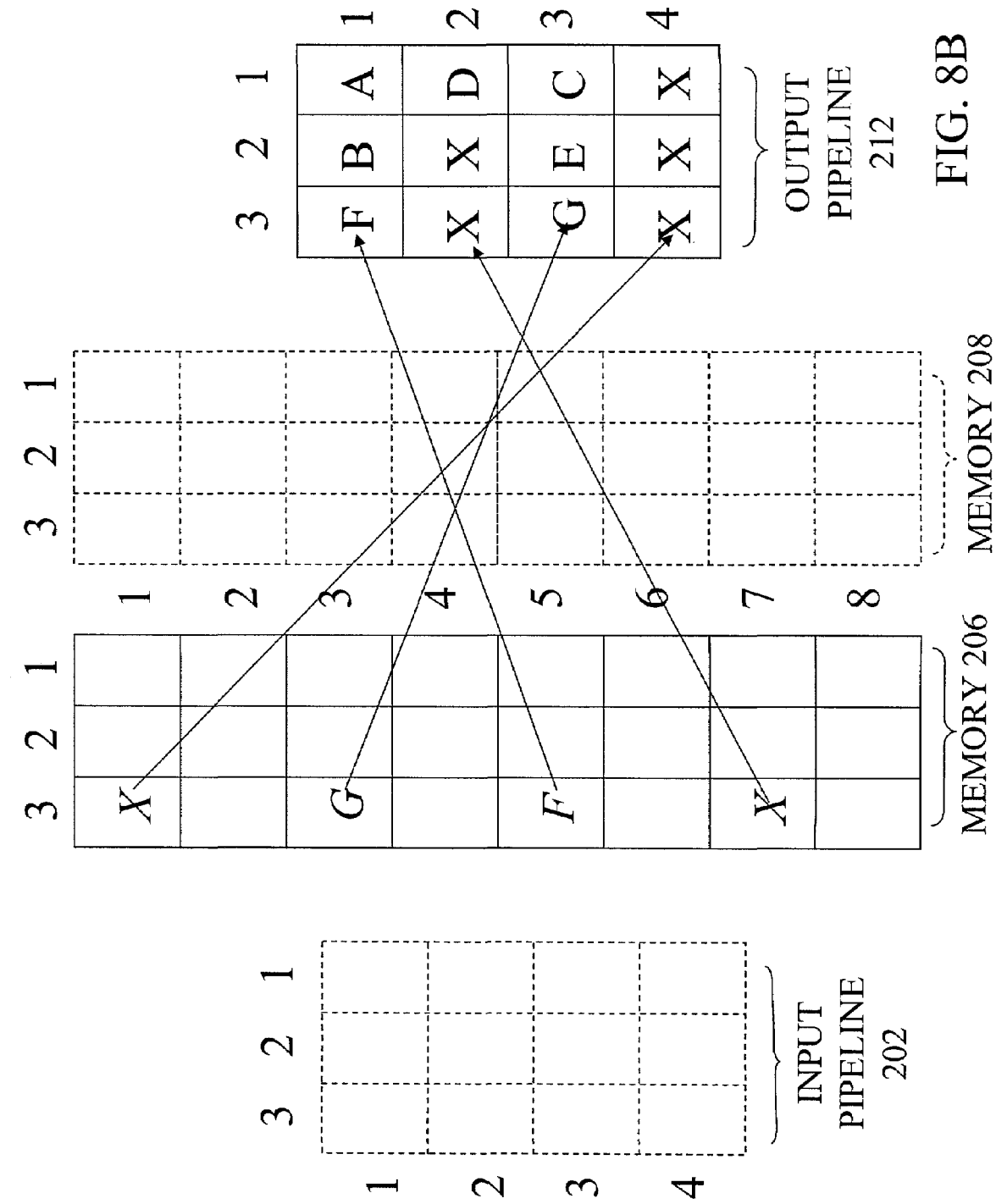
Figure 9:
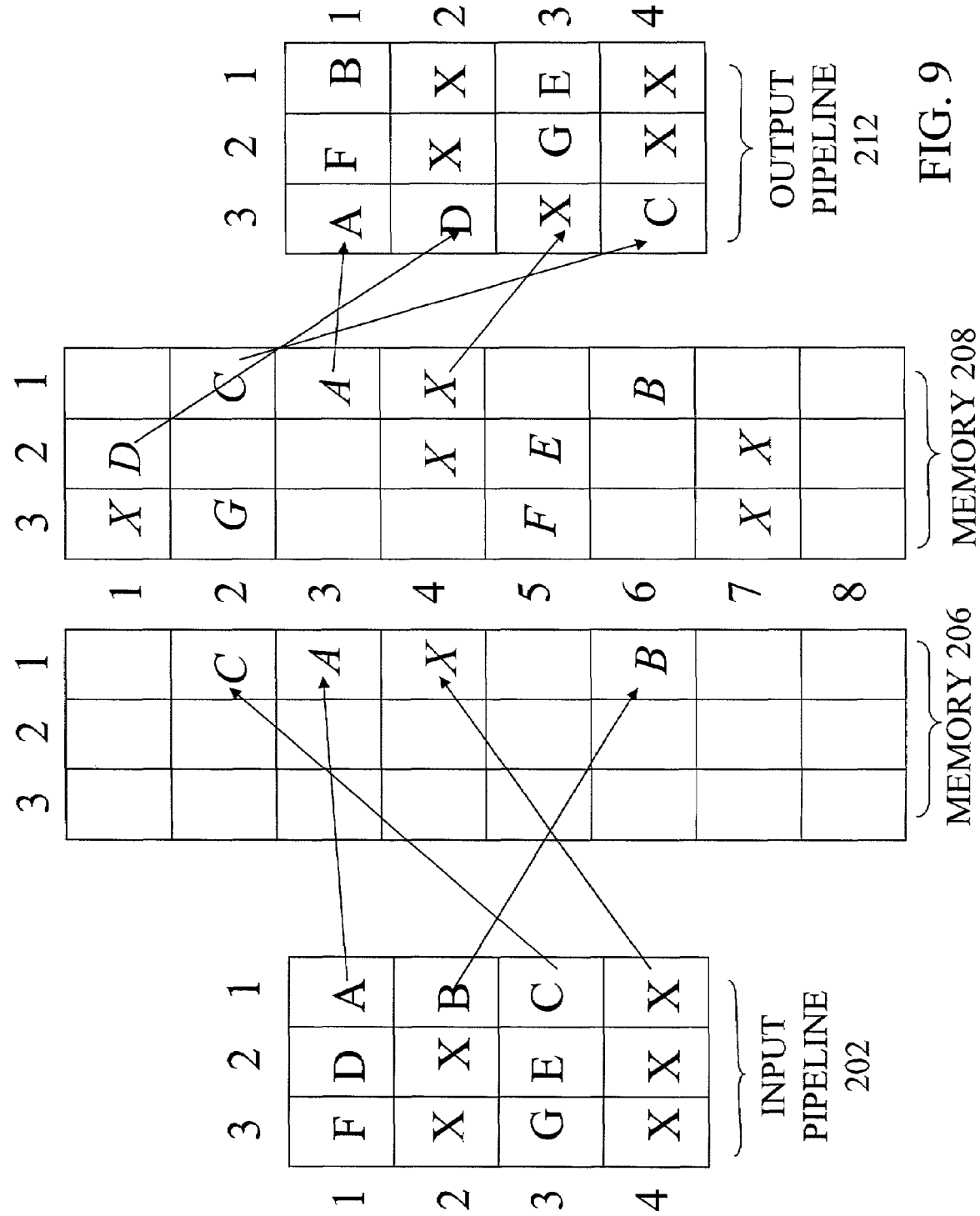
FIGS. 9–11 are block diagrams of the operations of the switching network of FIG. 2 during a third frame.
Figure 10:
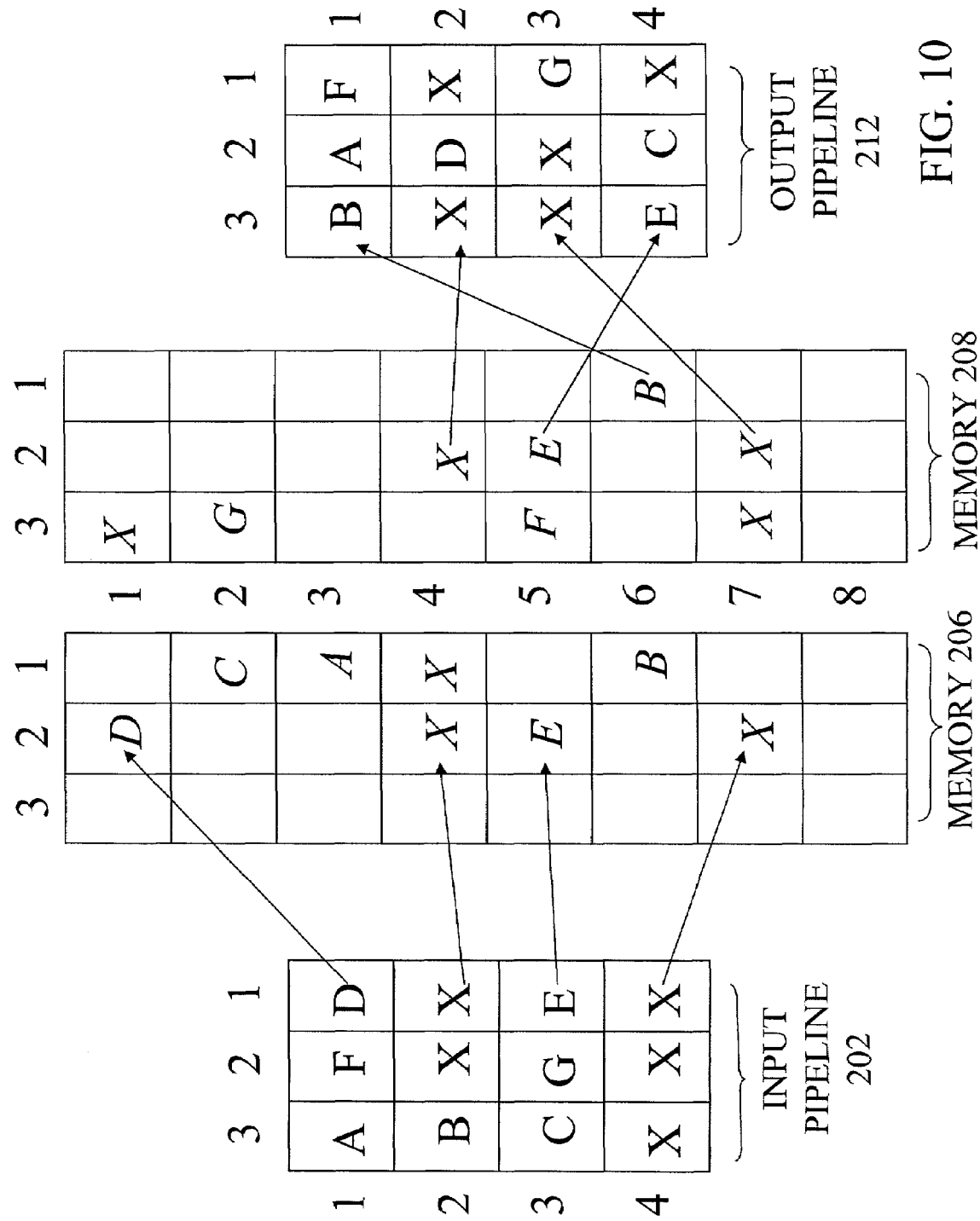
Figure 11:
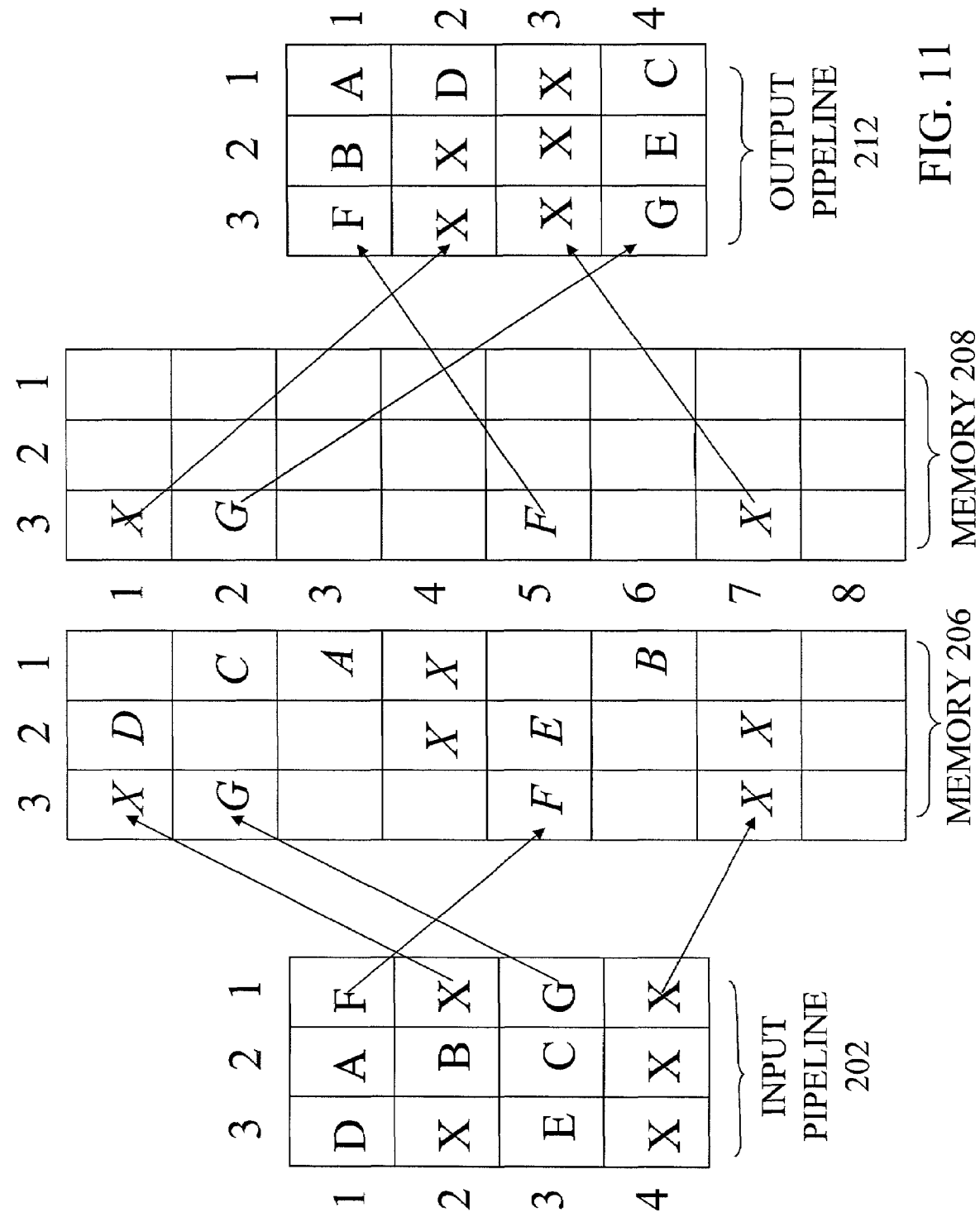

Each FIGS. 3–11 represents one clock cycle. FIGS. 3–5 illustrate switching communications signals in both the first and second stages according to a first set of paths. FIGS. 6A–8B illustrate switching communications signals in the first stage according to a second set of paths and switching communications signals in the second stage according to the first set of paths. FIGS. 9–11 illustrate switching communications signals in both the first and second stages according to the second set of paths.

In this example, lane 1 comprises a line and lane 2 comprises a trib. Further, data represented by the letter "D" is to be dropped into the trib lane 2 and the data represented by the letter "B" is to be added into the line, lane 1. Lane 3 is a through lane and lane 4 is a protection facility for lane 3. In this exemplary embodiment, communications signals from lane 3 are transferred to lane 4.

As in any pipelined system, pipeline input 202 and pipeline output 212 move data forward (from the left to the right in the FIGS.) one position each clock cycle. As described in the aforementioned Ser. No. 09/974,448, communications signals flow from the first column of input pipeline 202 to and row in one column in memory 206 or 208 (space switching). Therefore, during the first clock cycle, column 1 of the input pipeline 202 is moved to column one of memory 206 or 208. During the second clock cycle, column 1 of input pipeline 202 is moved to the second column of memory 206 or 208. To summarize, the communications signals from column 1 of input pipeline 202 are moved to column w, where w is equal to the current time slot.

In the second stage, data from memory 206 or 208 is moved to column 3 of output pipeline 212. In distinction to the first stage, any column and row may be moved to any row of column 3 of output pipeline 212 (time and space switching) during one clock cycle. According to this embodiment of this invention, only one read operation may be performed in a row during one clock cycle. This constraint is imposed by current memory design, and, therefore, one skilled in the art will understand how to read more than one communications signal from a row when such memories become available.

Turning to FIG. 3, the actions during a first clock cycle of a first frame are illustrated. A subset of a first set paths are determined by controller 214 which communications signals in the first column of input pipeline 202 is delivered to which row in the first column of memory 208. Demultiplexer 204 is set to make the proper connections according to these paths. The communications signals represented by the letter "A" moves from row 1, column 1 of input pipeline 202 to row 1, column 1 of memory 206. "B", column 1, row 2 moves to column 1, row 7, and C, row 3, moves to column 1, row 4. Finally, X, row 4 of input pipeline, flows to column 1, row 5 of memory 206. All letters stored in memory 206 and 208 are denoted in Italics in the figures.

Simultaneously, during the first clock cycle, another subset of the first set of paths are determined by controller 214, to direct communications signals in memory 208 is delivered to the first column in output pipeline 212. (Memory 208 was filled during a previous frame according to the same first set of paths as described above). Read pointer 218 and multiplexer 210 are set to make the proper connections. The communication signals represented by the letter "A" moves from column 1, row 1 of memory 208 to column 3, row 1 of output pipeline 212. "D", column 2, row 2 moves to column 3, row 2. "C" moves from column 1, row 4 to column 3, row 3. Finally "X" moves from column 1, row 5 to column 3, row 4.

FIG. 4 illustrates a second clock cycle of the first frame. Controller 214 selected paths from the first set of paths through demultiplexer 204 for the next column of data from input pipeline 202 (which has advanced to column 1, as stated above). "D" moves from row 1 to column 2, row 2, "X" moves from row 2 to column 2, row 4, "E" moves to column 2, row 3 "X" moves to column 2, row 6.

Also during the second clock cycle of the first frame, controller 214 selected paths from the first set of paths through multiplexer 214 and the read pointer for the next column of data. "E" moves from column 2, row 3 to column 3, row 3 of output pipeline 212. "X" moves from column 2, row 4 to column 3, row 2. "X" moves from column 2, row 6 to column 3, row 4. "moves from column 1, row 7 to column 3, row 1.

FIG. 5 illustrates a third (and last) clock cycle of the first frame. Controller 214 selects paths from the first set of paths through demultiplexer 204 for data from the third column of input pipeline 202 (which has now moved to column 1 of input pipeline 202). "F" moves to column 3, row 5, "X" moves to column 3, row 7, "G" moves to column 3, row 3, and finally "X" moves column 3, row 1.

During the third clock cycle of the first frame, controller 214 selects paths through multiplexer 214 from the first set of paths and the read pointer for the next column of the output pipeline 212. "X" moves from column 3, row 1 to column 3, row 4. "G" moves from column 3, row 3 to column 3, row 3. "F" moves from column 3, row 5 to column 3, row 1. "X" m from column 3, row 7 to column 3, row 2 of output pipeline 212. At this point, the first frame comprising three clock cycles is complete.

FIGS. 6A–8B illustrates the second frame, which comprises a hitless switch from one set of paths to another. For example, switching network 142 may be ordered to protection switch trib 3 to trib 4. The input at input pipeline 202 remains the same, but the output needs to change from trib 3 to trib 4. To this end, controller 214 recalculates the set of paths through switching network 142, to derive a second set of paths. The first stage is switched according to a second set of paths. However, the second stage is switched according to the first set. In this manner, no communications signals are lost.

FIGS. 6–8 have A and B section to illustrate more clearly the movement according to the first and second sets of paths. Because the input is moved to memory 208 and the output from memory 206 to output pipeline 212, the FIGS are cleaner with A and B sections. The pipeline and memory not being discussed is shown in phantom. While these are shown in two drawings, the operations occur during the same frame.

Figure 6A:
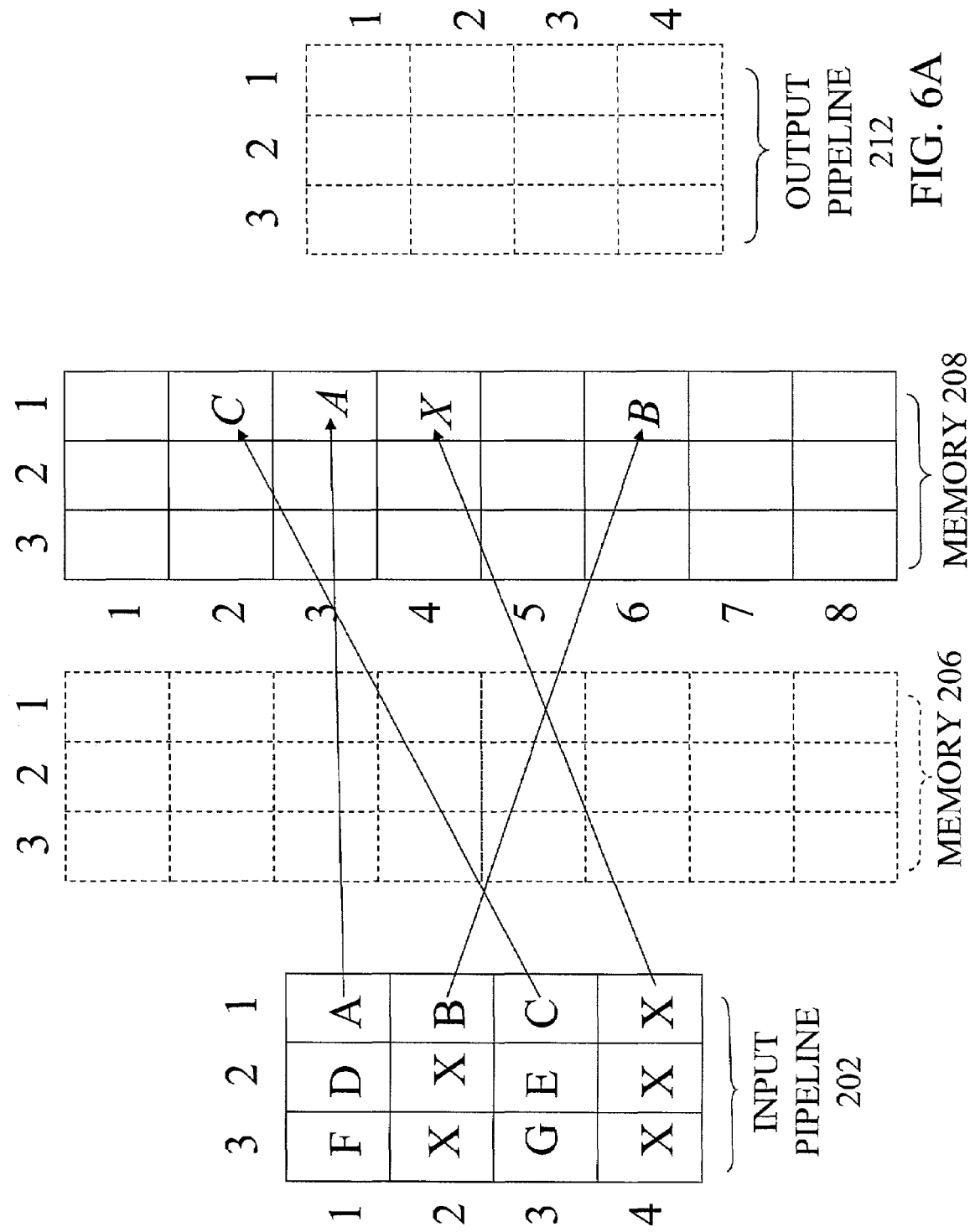

FIG. 6A illustrates a first switching stage during a first clock cycle of the second frame. The first stage is operating according to the second set of paths. Input pipeline 202 appears the same as it did at the beginning of the first frame. "A" moves to column 1, row 3, "B" moves to column 1, row 6, "C" moves to column 1 row 2 and "X" moves to column 1, row 4 of memory 208.

Figure 6B:
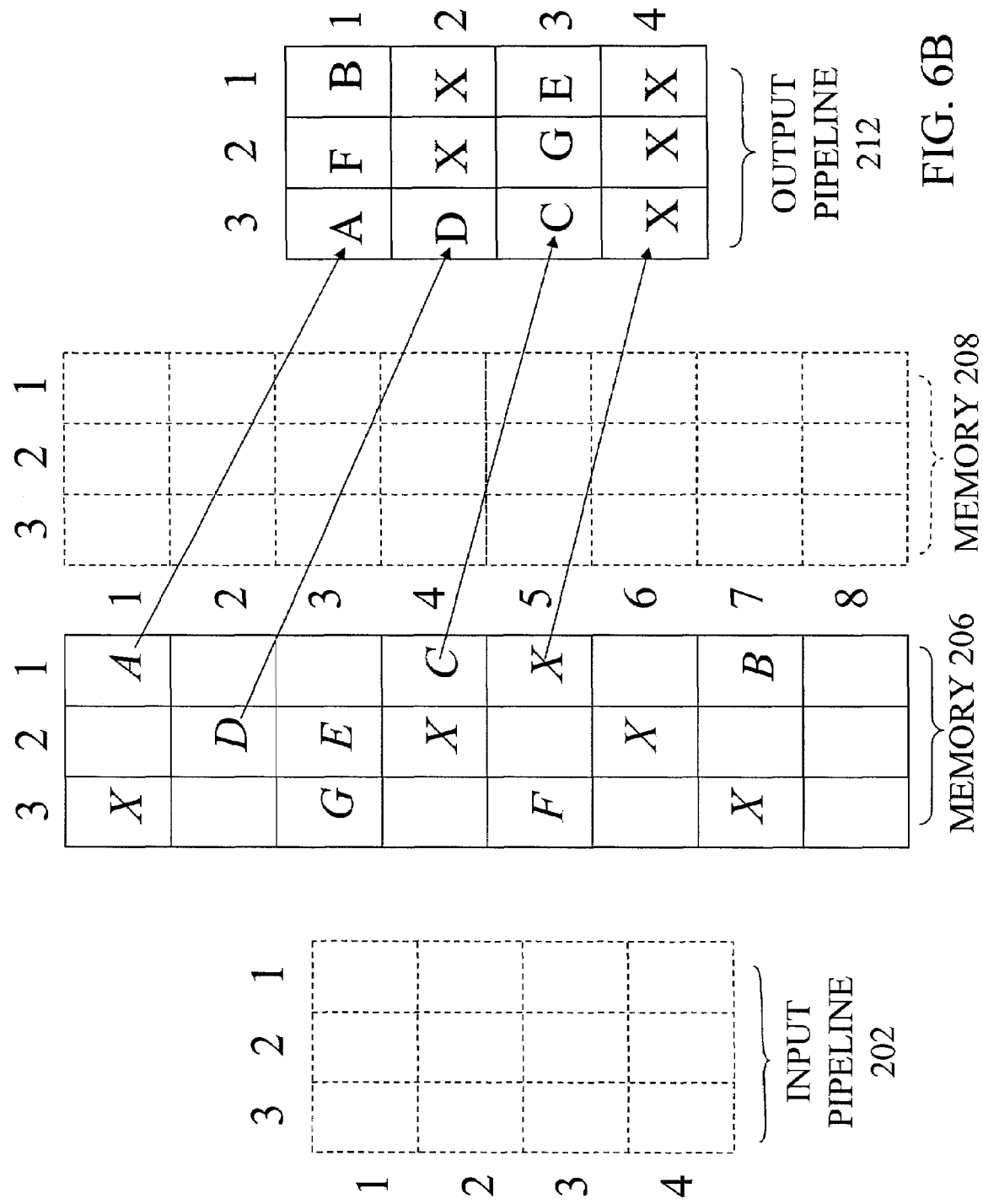

Simultaneously, FIG. 6B illustrates that controller 214 sets read pointer 218 into memory 206 and sets the data paths through multiplexer 210 to deliver the data in the proper space and time order to output pipeline 212 according to the first set of paths. In this step, any row and any column can be moved into any column during one clock cycle (time and space switching). "A" moves from column 1, row 1 to column 3, row 1 of output pipeline 212. "D" moves from column 2, row 2 of memory 206 to column 3, row 2 of output pipeline 212. "C" moves from column 1, row 4 of memory 206 to column 3, row 3 of the output pipeline 212. "X" moves from column 1, row 5 of memory 206 to column 3, row 4 of output pipeline 212.

FIG. 7A illustrates the second clock cycle of the second frame. Controller 214 selected paths through demultiplexer 204 according to the second set of paths for the next column of rows from input pipeline 202. "D" moves from row 1 column 1 to column 2 row 1 of memory 208. "X" moves to column 2 row 4 of memory 208. "E" moves to column 2, row 5 and "X" moves to column 2 row 7 of memory 208.

Simultaneously, FIG. 7B illustrates that controller 214 selects read pointer 218 and paths through multiplexer 210 for the next column of outputs according to the first set of paths. "B" moves from column 1, row 7 of memory 206 to column 3, row 1 of output pipeline 212. "X" moves from column 2, row 4 of memory 206 to column 3, row 2 of the output pipeline 212. "E" moves from column 2, row 3 of memory 206 to column 3, row 3 of output pipeline 212. "X" moves from column 2, row 6 of memory 206 to column 3, row 4 of output pipeline 212

FIG. 8A illustrates the third clock cycle of the second frame. Controller 214 selects paths through demultiplexer 204 according to the second set of paths for data from the third column of input pipeline 202. "F" moves to column 3, row 5, "X" moves to column 3, row 1, "G" moves to column 3, row 2, and finally "X" moves to column 3, row 7 of memory 208.

Simultaneously, FIG. 8B illustrates that controller 214 selects read pointer 218 and paths through multiplexer 210 for the next column of outputs according to the first set of paths. "F" moves from column 3, row 5 of memory 206 to column 3, row 1 of the output pipeline 212. "X" moves from column 3, row 1 of memory 206 to column 3, row 4 of output pipeline 212. "G" moves from column 3, row 3 of memory 206 to column 3, row 3 of output pipeline 212. X" moves from column 3, row 7 of memory 206 to column 3, row 2 of output pipeline 212. These actions complete a second frame, in which the first stage was operated according to a second set of paths and the second stage was operated according to a first set of paths.

FIGS. 9–11 illustrate a third frame wherein the data is moved from input pipeline 202 to memory 206 according to the second set of paths and data is moved from memory 208 according to the second set of paths. FIG. 9 illustrates the first clock cycle of the third frame. Controller 214 sets the data paths through demultiplexer 204 according to the second set of paths. "A" moves from column 1, row 1 of input pipeline 202 to column 1, row 3. "B" moves from column 1, row 2 to column 1, row 6 of memory 206. "C" moves from column 1, row 3 to column 1, row 2. "X" moves from column 1, row 4 to column 1, row 4.

Simultaneously, controller 214 moves data from memory 208 to output pipeline 212 according to the second set of paths. Thus, "C" moves from memory 208 column 1, row 2 to column 3, row 4 of output pipeline 212 in order to implement the protection switch. "A" moves from column 1, row 3 to column 3, row 1. "X" moves from column 1, row 4 to column 3, row 3 Finally, "D" moves from column 2, row 1 to column 3, row 2.

FIG. 10 illustrates the second clock cycle of the third frame. Controller 214 sets the data paths through demultiplexer 204 according to the second set of paths for the second clock cycle "D" moves from input pipeline 202 column 1, row 1 to column 2, row 1 of memory 206. "X" moves to column 2, row 4, "E" moves to column 2, row 5, and "X" moves to column 2, row 7.

Simultaneously, controller 214 selects read pointer 216 and paths through multiplexer 204 for the next column of outputs according to the second set of paths. "B" moves from column 1, row 6 of memory 208 to column 3, row 1 of output pipeline 212. "X" moves from column 2, row 4 of memory 208 to column 3, row 2 of output pipeline 212. "X" moves from column 2, row 7 of memory 208 to column 3, row 3 of output pipeline 512. "E" moves from column 2, row 5 of memory 208 to column 3, row 4 of output pipeline 212.

FIG. 11 illustrates the third clock cycle of the third frame. Controller 214 sets the data paths through demultiplexer 204 according to the second set of paths. "F" moves from column 1, row 1 to column 3, row 5, "X" moves from column 1, row 2 to column 3, row 1, "G" m column 1, row 3 to column 3, row 2 and "X" moves from column 1 row 4 to column 3, row 7.

Simultaneously, controller 214 sets read pointer 216 and the data paths through demultiplexer 204 according to the second set of paths. "F" moves from column 3, row 5 of memory 208 to column 3, row 1 of output pipeline 212. "X" moves from column 3, row 1 of memory 208 to column 3, row 2 of output pipeline 212. "X" moves from column 3, row 7 of memory 208 to column 3, row 3 of output pipeline 212. "G" moves from column 3, row 2 of memory 208 to column 3, row 4 of output pipeline 212. These actions complete the third frame.

Figure 12:
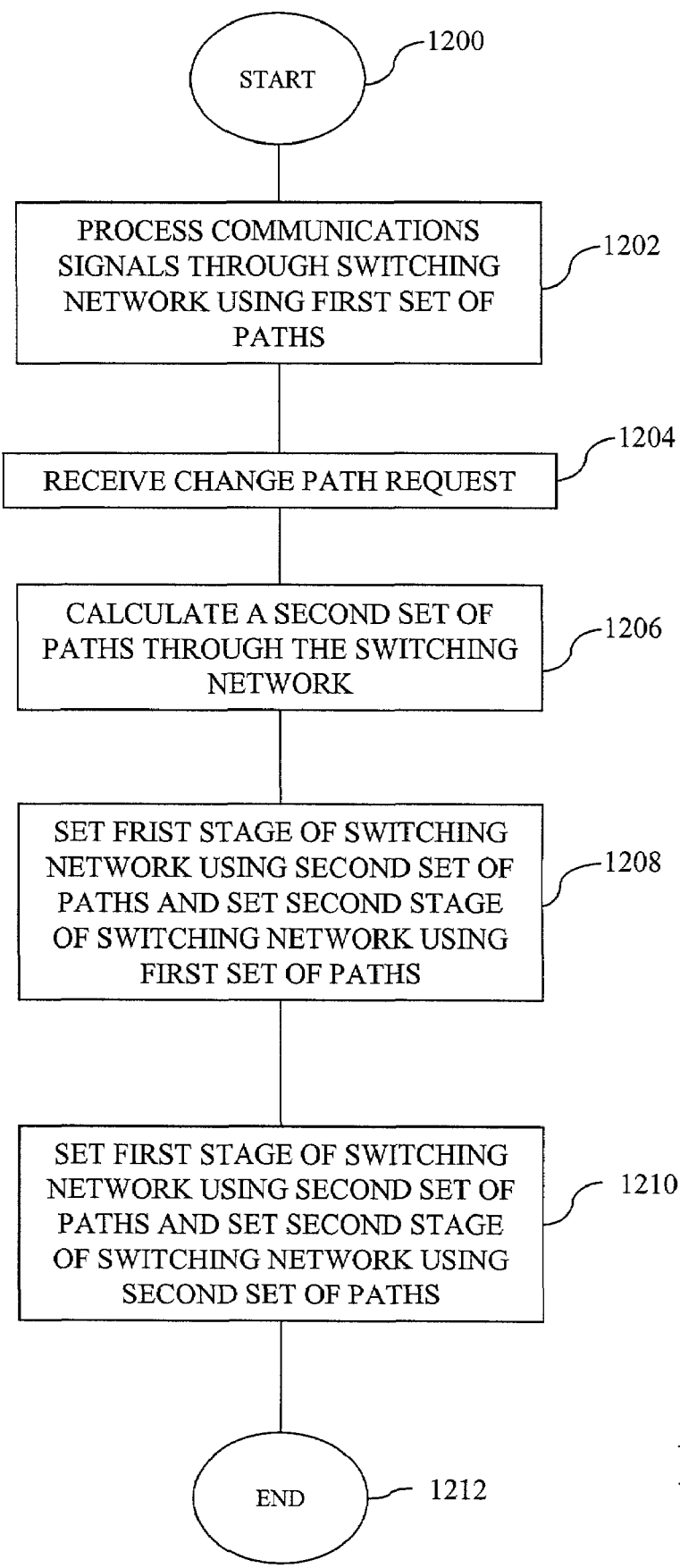
FIG. 12 is a flow chart of operations performed by the controller of the switching network of FIG. 2.

FIG. 12 is a flowchart of processing in controller 214. Processing begins in circle 1200 and moves to action box 1202 wherein the controller is processing communications signals through the switching network according to a first set of paths. Processing proceeds to action box 1204, wherein the controller receives a change request. Processing continues to action box 1206, where the controller calculates a route through the switching network that provides each time slot presented on each clock cycle at the input with a non-blocking path through the switching network. If time slot interchanging is necessary, that is also determined.

Once the calculations are made, processing proceeds to action box 1208 wherein the controller sets paths in the first stage according to the first set of paths and paths through the second stage according to the second set of paths. In the next frame, action box 1210, the controller sets paths in the first stage and the second stage according to the second set of paths. Processing ends in circle 1212.

Figure 13:
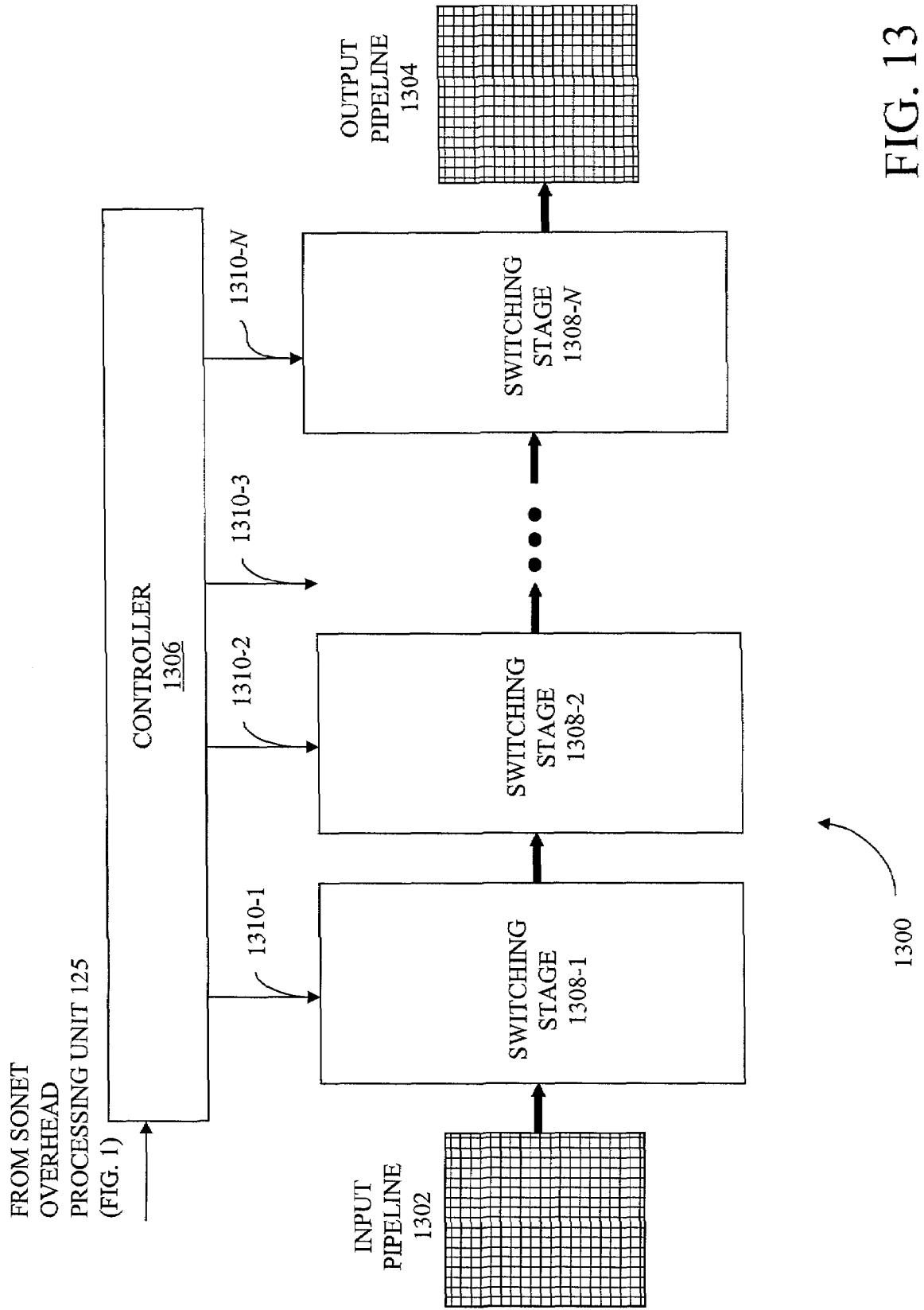
FIG. 13 is a block diagram of a generalized embodiment of this invention.

FIG. 13 is a generalized exemplary embodiment of this invention. FIG. 13 illustrates a switching network 1300 having an input pipeline 1302, and output pipeline 1304 and a controller 1306, which are all the same or similar in functionality to their respective counterpart in FIG. 2. Switching network1300 of this exemplary embodiment includes N switching stages 1308. Controller 1306 controls each switching stage 1308-1, 1308-2 through 1308-N independently along control lines 1310-1, 1310-2, 1310-3 through 1310-N.

In the exemplary embodiment of FIG. 13, controller 1306 controls all switching stages 1308-1 through 1308-N using a first set of paths. When a change is requested, controller 1206 calculates a second set of paths through each of the N stages 1308. At the beginning of a frame, controller 1306 sends the second set of paths via control line 1310-1 to switching stage 1308-1. Controller 1306 sends the first set of paths via control lines 1310-2 through 1310-N to switching stages 1308-2 through 1308-N. During the next frame, controller 1306 sends the second set of paths to switching stage 1308-1 and switching stage 1308-2 via control lines 1310-1 and 1310-2, respectively. Controller 1306 sends the first set of paths to the other N switching stages. This process continues sequentially until all N switching stages 1308 are using the second set of paths.

A further variation of the switching network 1300 allows more than two sets of paths to be used at the same time. For example, controller 1306, responsive to several problems in the network, may send a first set of paths to switching stage 1308-N, while an intermediate stage 1308 is using a second set of paths and switching stage 1308-1 is using a third (or higher) set of paths. Even in this multiple reconfiguration example, the exemplary embodiment of this invention does not lose one bit of data.

It is to be understood that the above-described embodiment is merely an illustrative principle of the invention and that many variations may be devised by those skilled in the art without departing from the scope of this invention. For example, the illustrative embodiment is described as a two-stage, space-time/space switching network. One skilled in the art will understand how to build a two-stage, time/space-space switching network and a multistage time/space-time/space switching network after studying this specification. It is, therefore, intended that such variations be included within the scope of the following claims.

What is claimed is:

1. A method for use in a switching network for changing from a first set of paths through said switching network to a second set of paths through said switching network, said switching network comprising a demultiplexer and a multiplexer, said method comprising:
   (a) switching via said demultiplexer and via said multiplexer according to said first set of paths;
   after one frame of data is switched;
   (b) switching via said demultiplexer according to said second set of paths and switching via said multiplexer according to said first set of paths; and
   after another frame of data is switched;
   (c) switching via said demultiplexer and via said multiplexer according to said second set of paths;
   wherein said switching network further comprises a first buffer and a second buffer, and wherein said (a) comprises said demultiplexer switching data from an input into said first buffer according to said first set of paths while said multiplexer switches data from said second buffer to an output according to said first set of paths.

2. A method in accordance with claim 1 wherein said (b) comprises said demultiplexer switching data from an input into said second buffer according to said second set of paths while said multiplexer switches data from said first buffer to said output according to said first set of paths.

3. A method in accordance with claim 2 wherein said (c) comprises said demultiplexer switching data from said input into said first buffer according to said second set of paths while said demultiplexer switches data from said second buffer to said output according to said second set of paths.

4. A method in accordance with claim 1 wherein (a) occurs during a first frame, (b) occurs during a second frame and (c) occurs during a third frame.

5. A switching network comprising:
   an input comprising an x by y array;
   a demultiplexer for receiving said input and switching in the y domain;
   a multiplexer for switching the output of said demultiplexer in both the x and y domain into an output;
   a controller configured to set paths through said demultiplexer and said multiplexer independently;
   a first logical memory;
   a second logical memory; and
   a cyclical clock;
   wherein;
   during a first x clock cycles, said demultiplexer moves data from said input into said first logical memory via a first set of paths and said multiplexer moves data from said second logical memory to said output via said first set of paths;
   during a second x clock cycles, said demultiplexer moves data from said input into said second logical memory via a second set of paths and said multiplexer moves data from said first logical memory to said output via said first set of paths; and
   during a third x clock cycles, said demultiplexer moves data from said input into said first logical memory via said second set of paths and said multiplexer moves data from said second logical memory to said output via said second set of paths.

6. A switching network in accordance with claim 5 wherein said multiplexer is connected to first stage control leads of said controller.

7. A switching network in accordance with claim 6 wherein said multiplexer is connected to second stage control leads of said controller.

8. A switching network in accordance with claim 7 wherein said demultiplexer fills said first logical memory according to control signals on said first stage control leads from said controller, while said multiplexer empties said second logical memory according to control signals on said second stage control leads from said controller.

9. A method for use in a switching network for changing from a first set of paths through said switching network to a second set of paths through said switching network, said switching network comprising N stages, said method comprising:
   (a) switching in N stages according to said first set of paths, where N is greater than or equal to 2;
   (b) switching in M of said N stages according to said second set of paths and switching in M+1 trough N stages according to said first set of paths, where M=1 initially;
   (c) incrementing M and repeating step (b) until M=N; and
   (d) switching in said N stages according to said second set of paths.

10. A method in accordance with claim 9 wherein each repetition of (b) is one frame.

11. A method in accordance with claim 1 further comprising, before (a), receiving an optical signal and converting the optical signal to an electrical signal, the electrical signal comprising data that is organized into frames.

12. A method in accordance with claim 11 further comprising, after (c), generating an optical signal in response to the data and transmitting the optical signal.

* * * * *